H. ALLEN.
TEMPLET.
APPLICATION FILED DEC. 7, 1914.
1,237,143.
Patented Aug. 14, 1917.
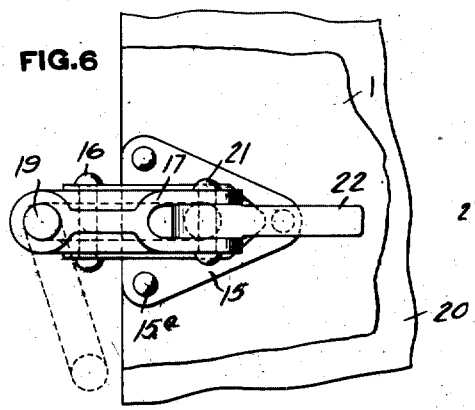
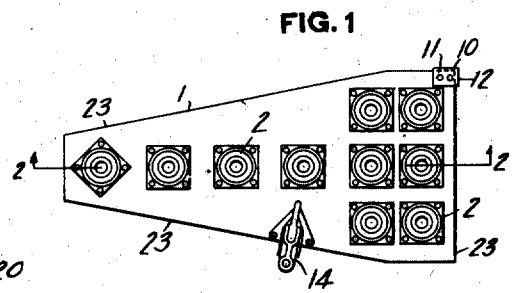
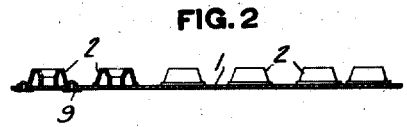
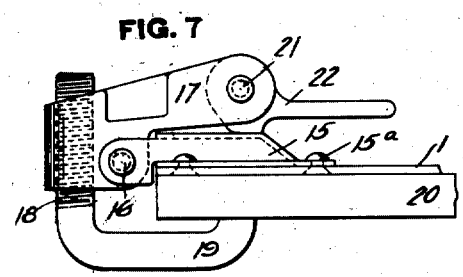
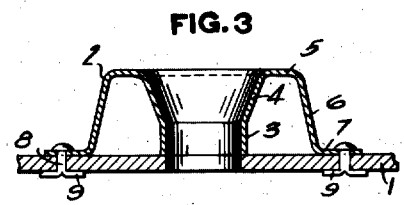
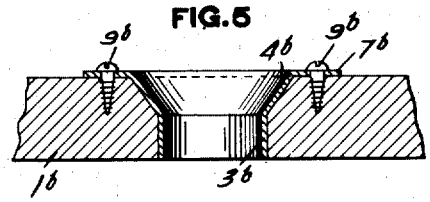
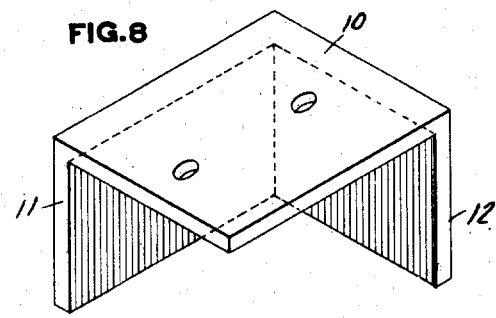
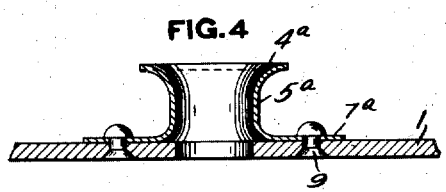
WITNESSES
INVENTOR
Harry Allen
By Fredk W. Winter,
Attorney.

UNITED STATES PATENT OFFICE.

HARVEY ALLEN, OF PITTSBURGH, PENNSYLVANIA.

TEMPLET.

1,237,143.   Specification of Letters Patent.   Patented Aug. 14, 1917.

Application filed December 7, 1914. Serial No. 875,876.

*To all whom it may concern:*

Be it known that I, HARVEY ALLEN, a resident of Pittsburgh, in the county of Allegheny and State of Pennsylvania, have invented a new and useful Improvement in Templets, of which the following is a specification.

This invention relates to jigs or templets to be applied to work of various kinds for the purpose of guiding or directing a tool which is to perform certain operations on said work, to the required place or places on said work where the operations are to be performed.

The object of the invention is to provide a jig or templet for this purpose which is of simple and cheap construction, which can be quickly applied to the work and removed therefrom, which will accurately guide or direct the tool to the desired spot or spots where the work is to be performed, and which is durable and capable of repeated uses.

In many lines of work where duplicate parts are to be formed it is the custom to use templets or jigs for guiding the tools. Such jigs or templets as heretofore constructed when of a fairly permanent nature have been of expensive construction. Many such templets and jigs have been of inexpensive construction, but in those cases they have been of very short life. In bridge and structural steel work the use of templets is very common. Many such templets have been made of wood, or even of paper, or thin sheet metal, but these are not of sufficiently durable construction to withstand the action of the tools, such for instance, as drills or punches, and consequently have been used only for center marking or punching work, and not for guiding the tools. The templets for guiding the tools and of sufficiently permanent construction to withstand repeated action of the tools have been formed of metal and have been heavy and expensive, and not readily applied to or removed from the work.

The object of the present invention is to provide a templet or jig which is of such permanent construction that it will withstand the repeated action of drills, punches or other tools and therefore can be used repeatedly for guiding or directing the tool, but which nevertheless is of cheap and simple construction and so arranged that it can be very readily applied to and removed from the work.

The invention comprises a jig or templet constructed and arranged as hereinafter described and claimed.

In the accompanying drawings, Figure 1 is a plan view of one form of templet embodying the invention; Fig. 2 is a longitudinal section therethrough on the line 2—2, Fig. 1; Fig. 3 is a section through one of the bushings showing the same on an enlarged scale; Fig. 4 is a similar view showing a modified form of bushing; Fig. 5 is a similar view showing another form of bushing applied to a wooden body; Fig. 6 is a plan view and Fig. 7 a side elevation of a suitable form of clamp; and Fig. 8 is a perspective view of a suitable form of gage.

The improved jig or templet has a body 1 formed of some cheap, light and inexpensive material, not of sufficiently durable nature in itself to withstand repeated action of tools, such as punches, drills or the like. Preferably, this body will be formed of thick, tough paper or light pasteboard, or it may be formed of thin sheet metal, or wood. In Figs. 1, 2, 3 and 4, it is shown formed of some thin material, such as tough paper or thin sheet metal, while in Fig. 5 it is shown as a thicker body $1^b$ of wood or the like. In all forms it is essentially a plate, but it need not lie in a single plane, as it may be suitably shaped in any way to conform to the shape of the article to which it is to be attached and may be curved or have portions lying in different planes, as desired. While this plate may be formed of very durable material, yet for the sake of cheapness and lightness it is preferably formed of one of the materials above named which is not sufficiently durable to withstand repeated actions of the tools. Indeed, the material of the body may be such as has heretofore been used for such templets as have been used exclusively for center punching or marking the places on which the tool is to operate.

Suitable durable tool guiding and directing means are secured to this relatively destructible body in order to make the templet or jig capable of repeated use for guiding or directing the tool. These tool guiding and directing means are shown in the form of bushings 2, which may be variously formed and which will be secured to the body of the templet at such points as the tool is to operate upon the work. As shown in Figs. 1 and 2, the bushings are pressed from plate metal having the central portion with a substantially cylindrical portion 3 for the purpose of supporting the tool in central position, and having outside of the same a flaring portion 4 for the purpose of guiding the tool into the central position, and having the metal then carried outwardly, as at 5, and then downwardly as at 6, with an outturned flange 7 at its lower face, adapted to rest upon the body 1 of the templet and provided with openings through the flange for receiving suitable means for securing it to the body of the templet. As shown, the base of the bushing is substantially square and provided at each corner with a hole 8 for receiving a screw, or the like. In case the body of the templet is thick paper or thin pasteboard, or thin sheet metal, the securing means may be a rivet, such as the split rivet shown at 9. The portions 3 and 4 of the ferrule will have their surfaces suitably hardened so as to withstand wear, and therefore form a very permanent means for guiding and supporting the tool while working.

Fig. 4 shows another form of ferrule having the outward flaring portion 4$^a$ and the substantially cylindrical portion 5$^a$ and having its lower edge flanged outwardly, as at 7$^a$, and resting upon and secured to the body of the templet by rivets 9$^a$.

In case the body of the templet is of wood the ferrule will be of the form shown in Fig. 5, and extending substantially through the body, with the cylindrical portion 3$^b$, and upwardly thereof the flaring portion 4$^b$, and having the flange 7$^b$ at its upper edge and resting on the top surface of the body of the templet and secured thereto by screws 9$^b$.

When the body of the templet is of thin material, such as paper, pasteboard or thin sheet metal, no holes need be cut through the body thereof, but the bushings will be fastened thereto at the proper positions, and the hole will be cut through the templet upon the first application of the tool. In case of a wooden body, however, it is necessary to first cut holes through the body at the proper points and then secure the bushings in such holes.

The bushings described are of very simple construction, and are very readily attached to the body, by merely nailing, riveting or screwing the same thereon. They can be spaced in any proper relations with reference to each other, as desired for the necessary work, and the entire construction is very cheap, light, and nevertheless durable, as the bushings are the only parts that are subjected to wear.

In order to facilitate the ready placing of the templet on the work in proper position one or more suitable gages are preferably secured to suitable points on the body, one being shown at a corner thereof, as at 10, and comprising a member having downwardly projecting flanges or walls 11 and 12 at suitable angles to each other and adapted to engage, for instance, over the corner of a plate or other piece of work to be operated upon, and which will accurately position the templet on the work.

To hold the templet firmly in position on the work while the tools are operating, and prevent its accidental displacement the templet is also provided with one or more suitable clamps, shown generally at 14 and preferably secured to the templet on the side opposite the gage 10, although they may be secured wherever desired. This clamp may be of various constructions, that shown comprising a body or base portion 15 secured to the body of the templet by suitable means, such as split or solid rivets 15$^a$, and having pivoted thereon at 16 the lever 17, which at its outer end is threaded and engaged by the threaded portion 18 of the clamping member 19 which is arranged to extend underneath the plate or other piece of work 20 and engage the latter. The free end of lever 17 has fulcrumed thereto at 21 a cam 22 by means of which the clamp 19 can be drawn into engagement with the work 20 or disengaged therefrom. The threaded connection at 18 enables the clamping member 19 to be adjusted to adapt it to firmly engage work of different thickness.

The templet may also be used for marking working outlines upon an article, in which case it is given the required shape, and its edges 23 are used for guiding a marking tool or other instrument. For this purpose the bushings are not essential but the clamps and gages are attached to the body and are used in the same manner before described.

The templet described is of simple and cheap construction, and yet is durable so that it can be repeatedly used as a guide and support for the tool, and not merely for center punching or marking the work. It can be very quickly adjusted in position on the work, with its several bushings accurately located, and can be very readily removed. It is much lighter, and less complicated than permanent templets and jigs as heretofore constructed, and is equally as durable.

It will be understood that the body of the templet can be made of any suitable material, even metal, but when made of metal will not be of a strength sufficient to withstand repeated applications of the tool. By the expression "material adapted to be readily penetrated by the tool" as used in the claims hereafter is meant any material, even though metal, which while it is sufficient to carry the bushings, is not sufficiently strong or durable to prevent the material around the holes from being quickly deformed by the tool so that it will no longer act as a tool guide and support.

What I claim is:—

1. A templet or jig, comprising a plate body of material adapted to be readily penetrated by the tool to be guided, and metallic tool guiding and supporting bushings secured to an imperforate portion of said plate body.

2. A templet or jig, comprising a thin plate body of material adapted to be readily penetrated by the tool, and tool supporting and guiding bushings secured thereto, said bushings being formed of plate metal pressed to provide an inner annular tool supporting opening and an outwardly flaring tool guiding portion and having one edge extending outwardly to form a flange resting on the surface of the plate body, and means extending through said flanges and into the body for securing the bushings in place.

In testimony whereof, I have hereunto set my hand.

HARVEY ALLEN.

Witnesses:
ALBERT C. ROHLAND,
ELBERT L. HYDE.